(12) United States Patent
Fein et al.

(10) Patent No.: US 10,768,344 B2
(45) Date of Patent: Sep. 8, 2020

(54) GRADIENT REFRACTIVE INDEX OPTICAL BLOCKS FOR VIRTUAL REALITY IMAGING APPLICATIONS

(71) Applicant: PEAK NANO OPTICS, LLC, Coppell, TX (US)

(72) Inventors: Howard Fein, Richmond Heights, OH (US); Michael Ponting, Broadview Heights, OH (US); Richard Flynn, Newbury Park, CA (US); Jame "Chad" C. Lewis, Crawford, TX (US); James Welsh, Dallas, TX (US)

(73) Assignee: PEAK NANO OPTICS LLC, Coppell, TX (US)

( * ) Notice: Subject to any disclaimer, the term of this patent is extended or adjusted under 35 U.S.C. 154(b) by 138 days.

(21) Appl. No.: 15/972,796

(22) Filed: May 7, 2018

(65) Prior Publication Data

US 2019/0056537 A1 Feb. 21, 2019

Related U.S. Application Data

(60) Provisional application No. 62/503,208, filed on May 8, 2017.

(51) Int. Cl.
*G02B 5/18* (2006.01)
*G02B 3/08* (2006.01)
*G02B 3/00* (2006.01)
*G02B 27/01* (2006.01)

(52) U.S. Cl.
CPC .............. *G02B 3/08* (2013.01); *G02B 3/0087* (2013.01); *G02B 27/0172* (2013.01); *G02B 5/1842* (2013.01); *G02B 5/1866* (2013.01); *G02B 2027/011* (2013.01); *G02B 2027/0147* (2013.01)

(58) Field of Classification Search
CPC .......... G02B 3/00; G02B 3/0087; G02B 5/18; G02B 2005/1804; G02B 5/1814; G02B 5/1842; G02B 5/1866; G02B 5/1871; G02B 5/1876; G02B 5/189; G02B 5/1895; G02B 27/0025; G02B 27/0037; G02B 27/42; G02B 27/4205; G02B 27/4211; G02B 27/01; G02B 27/0101; G02B 2027/0116; G02B 2027/0123; G02B 27/017; G02B 27/0172; G02B 2027/0178
USPC ....... 359/558, 565, 566, 569, 570, 571, 574, 359/576, 642, 643, 648, 652, 654
See application file for complete search history.

(56) References Cited

U.S. PATENT DOCUMENTS

| 9,939,648 B2* | 4/2018 | Lee .................... G02B 27/0172 |
| 2015/0219895 A1* | 8/2015 | Laycock ............ G02B 27/0025 359/630 |
| 2015/0234188 A1* | 8/2015 | Lee .................... G02B 27/0093 345/633 |
| 2016/0154144 A1* | 6/2016 | Sanghera ............... G02B 1/118 359/601 |
| 2018/0031843 A1* | 2/2018 | Pan .................... G02B 27/0172 |

* cited by examiner

*Primary Examiner* — Arnel C Lavarias
(74) *Attorney, Agent, or Firm* — Haynes and Boone, LLP (57) ABSTRACT

A virtual reality headset incorporating gradient refractive index (GRIN) lenses within the optical blocks thereof. Optical blocks of varying size and position are used. GRIN lenses are fabricated to fit within the optical block and are shaped to possess desired application-specific characteristics such as having one or more diffractive surfaces.

11 Claims, 9 Drawing Sheets

An Example of a Virtual Reality (VR) polymeric nano-layer GRIN optical lens Element

GRADIENT REFRACTIVE INDEX OPTICAL BLOCKS FOR VIRTUAL REALITY IMAGING APPLICATIONS

CITATION TO PRIOR APPLICATIONS

The present application claims priority to U.S. Provisional Application No. 62/503,208, entitled "GRADIENT REFRACTIVE INDEX OPTICAL BLOCKS FOR VIRTUAL REALITY IMAGING APPLICATIONS" and filed May 8, 2017.

RELATED PATENTS

U.S. Pat. No. 7,002,754 (issued Feb. 21, 2006) for "Multilayer polymer gradient index (GRIN) lenses"; U.S. Pat. No. 8,902,508 (issued Dec. 2, 2014) for "Consolidated multilayered gradient refractive index optical materials"; and U.S. Pat. No. 9,435,918 (issued Sep. 6, 2016) for "Aspherical Grin Lens" are incorporated herein by reference in their entirety. Additionally, U.S. Pat. No. 9,599,822 (issued Mar. 21, 2017) for "Corrective optics for reducing fixed pattern noise in a virtual reality headset"; and U.S. Pat. No. 9,640,120 (issued May 2, 2017) for "Diffractive element for reducing fixed pattern noise in a virtual reality headset" are incorporated herein by reference in their entirety.

BACKGROUND AND DESCRIPTION OF THE INVENTION

Each of the incorporated VR headset patents reflect designs that incorporate conventional optics elements, while the GRIN lens-related patents provide fabrication and utilization enablement that a POSITA would use in making and using embodiments of that disclosed herein.

While most references herein are to "VR" or (virtual reality) headsets, this reference is to be understood to be to apparatuses involved alternatively in visualizing wholly, computer-generated images, in which case the involved optics are merely involved in refracting and focusing images for human perception, as well as those apparatuses (such as "night vision goggles", for example) that both collect existing, visual and near-visual wavelengths, process or "translate" them in some way, and then project them for human perception. In the latter instance, the involved GRIN lenses may be utilized either or both in gathering the to-be-processed waves and projecting processed images to a user.

In one embodiment, the substitution of GRIN lenses in VR headsets affords many advantages, particularly to end users. These include reduction of the "footprint" of the optics and of their mounting structures. This, in turn, reduces the minimum, overall headset size and weight. While such a reduction may not appear to be significant in the abstract, a context for use of VR headsets of a combat theater, for example, is one in which every ounce "counts" (for a soldier carrying numerous pieces of equipment), and size profile relates to visibility which can, in turn, be a "life or death issue" in some circumstances. While less compelling a need, even in the consumer market, any reduction of size and weight of VR headsets is one with many advantages, ranging from consumer appeal, to shipping costs for manufacturers and distributors.

To adapt conventional VR headset designs to the use of GRIN lenses, optics support or mounting structures must, in ways known generally to POSITAs in the GRIN field, be altered to account for thinner GRIN lenses (when compared to conventional optics), and must also be repositioned relative to the VR headsets optical sensors to account of the differing refractive indices of GRIN lenses (again, versus conventional optics).

Furthermore, VR headsets using GRIN lenses can (with an optimally small optics footprint) capture fields of view that, absent GRIN lenses, could only be achieved through use of heavier, less precise and more space-consuming Fresnel lenses. In certain applications, these factors precluded use of Fresnel lenses and, therefore, a compromise was made in the field of view provided by VR headsets. Additionally, GRIN lenses offer superior chromatic correction that conventional lenses cannot otherwise achieve.

In another embodiment, the same advantages can be had by improving conventional optics with GRIN technology. Through "layering" GRIN optics technology relative to conventional optics, in other words by applying the GRIN lens volume, i.e. subsurface, material to said conventional optics, additional optical focusing power and/or color correction for high resolution imaging can be achieved. Current approaches in utilizing spherical, aspheric, or Fresnel (i.e. diffractive grated surfaces) lenses as the sole source of optical lens power results in lower resolution imaging and larger optical lenses. GRIN represents a new design space based on recent developments in optical modeling tools to prescribe and optimize non-linear profiles that can be manufactured and reduced to practice only recently utilizing a nanolayered films material approach.

Because GRIN lenses have been known for quite some time, the failure of industry to realize the benefits to be gained by substituting conventions with GRIN-based optics is telling in the non-obvious nature of the present invention.

Figure 1A:
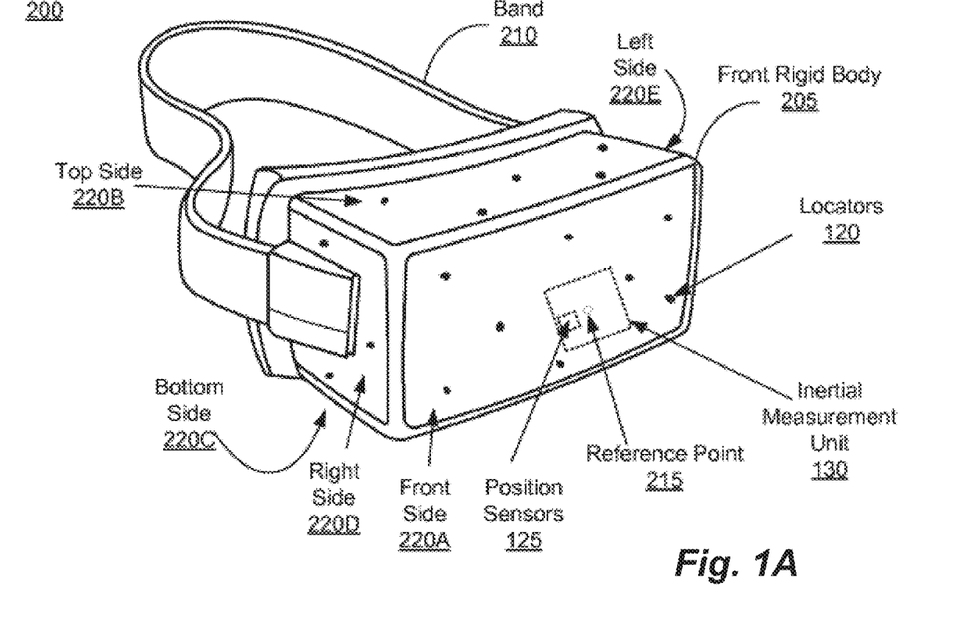
FIG. 1A is a diagram of virtual reality headset according to one or more aspects of the present disclosure.

FIG. 1A is a diagram of virtual reality headset 200 according to one or more aspects of the present disclosure.

The virtual reality headset 200 may include locators 120, position sensors 125, inertial measurement unit 130, front rigid body 205, and band 210. The front side 220A, top side 220B, bottom side 220C, right side 220D, and left side 220E of the virtual reality headset are also shown.

Figure 1B:
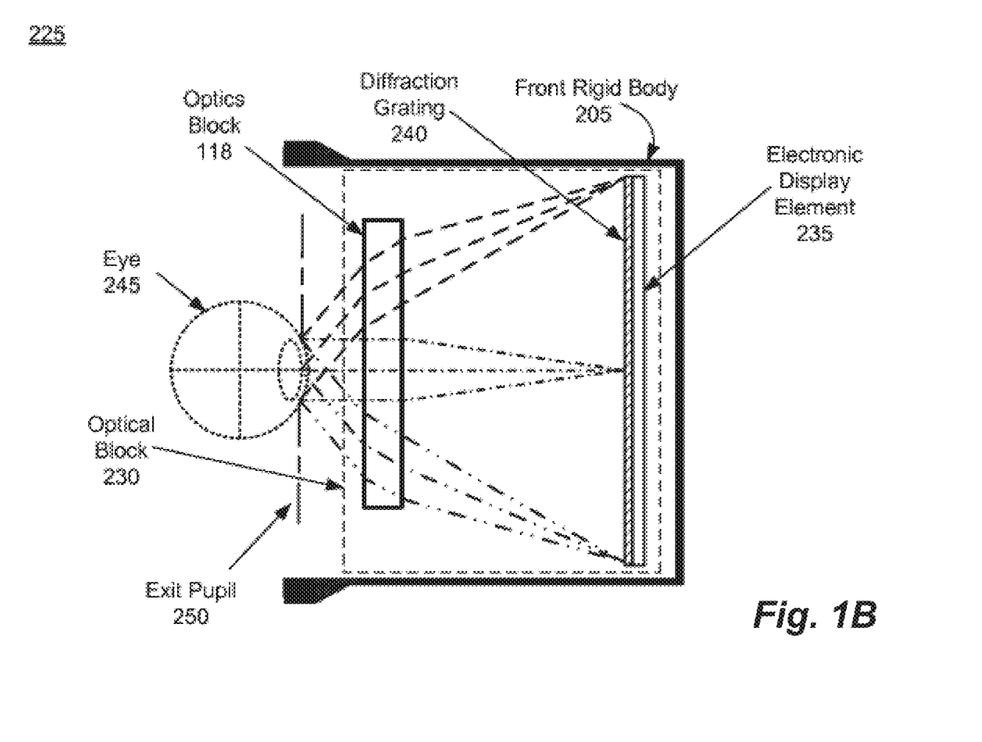
FIG. 1B is a cross-section of a front rigid body of the virtual reality headset of FIG. 1A according to one or more aspects of the present disclosure.
Figure 2:
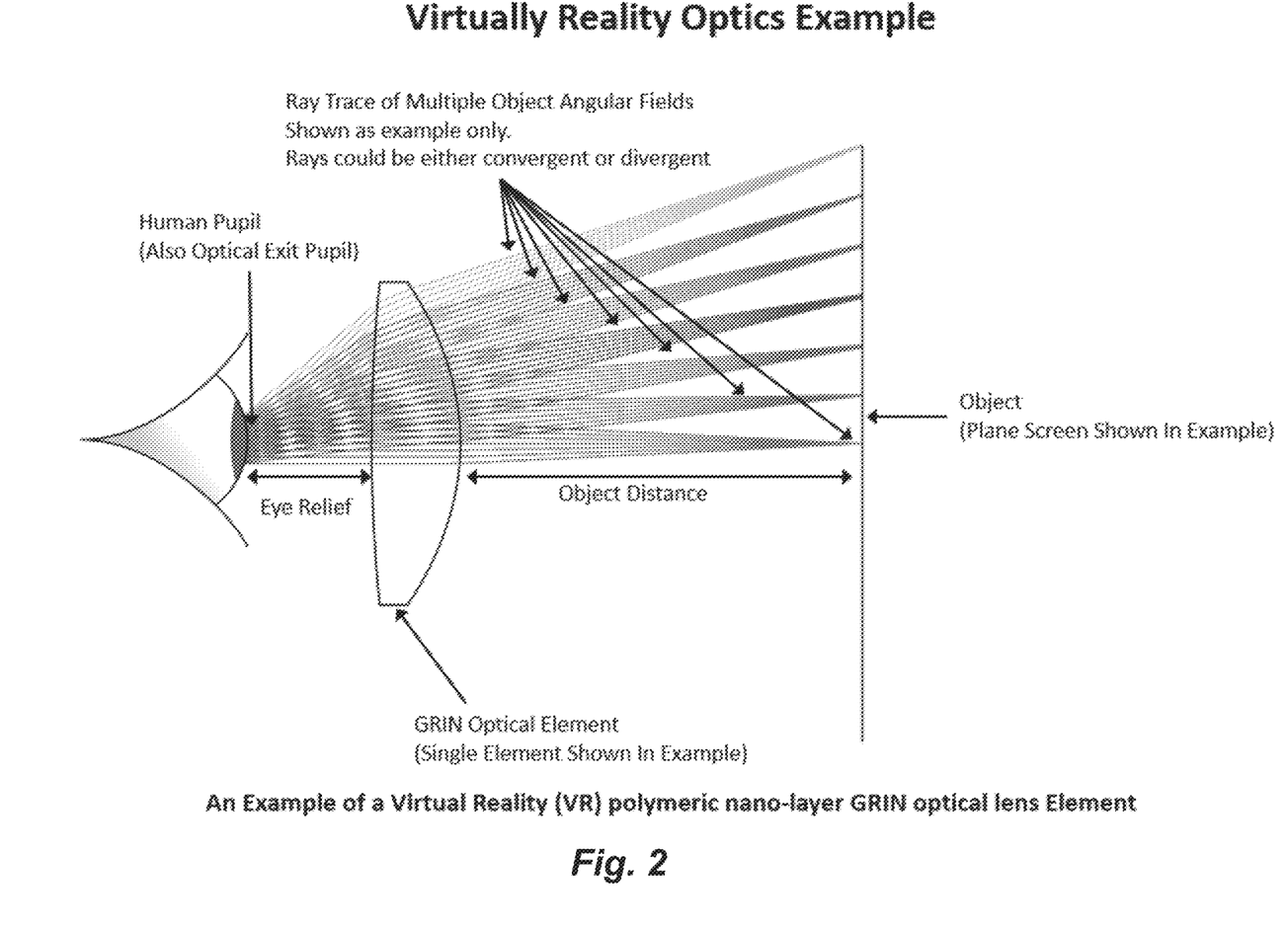
FIG. 2 is a diagram showing a virtual reality optics system according to one or more aspects of the present disclosure.
Figure 3:
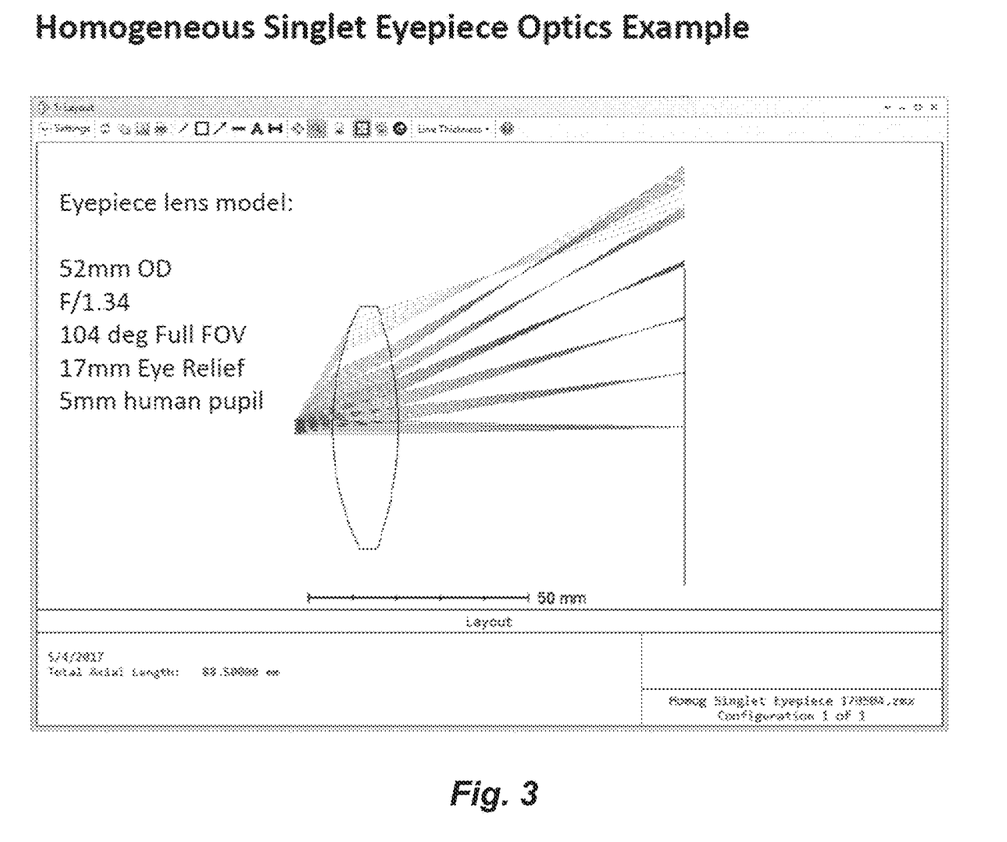
FIG. 3 is a diagram showing optical data for a homogeneous singlet eyepiece according to one or more aspects of the present disclosure.
Figure 4:
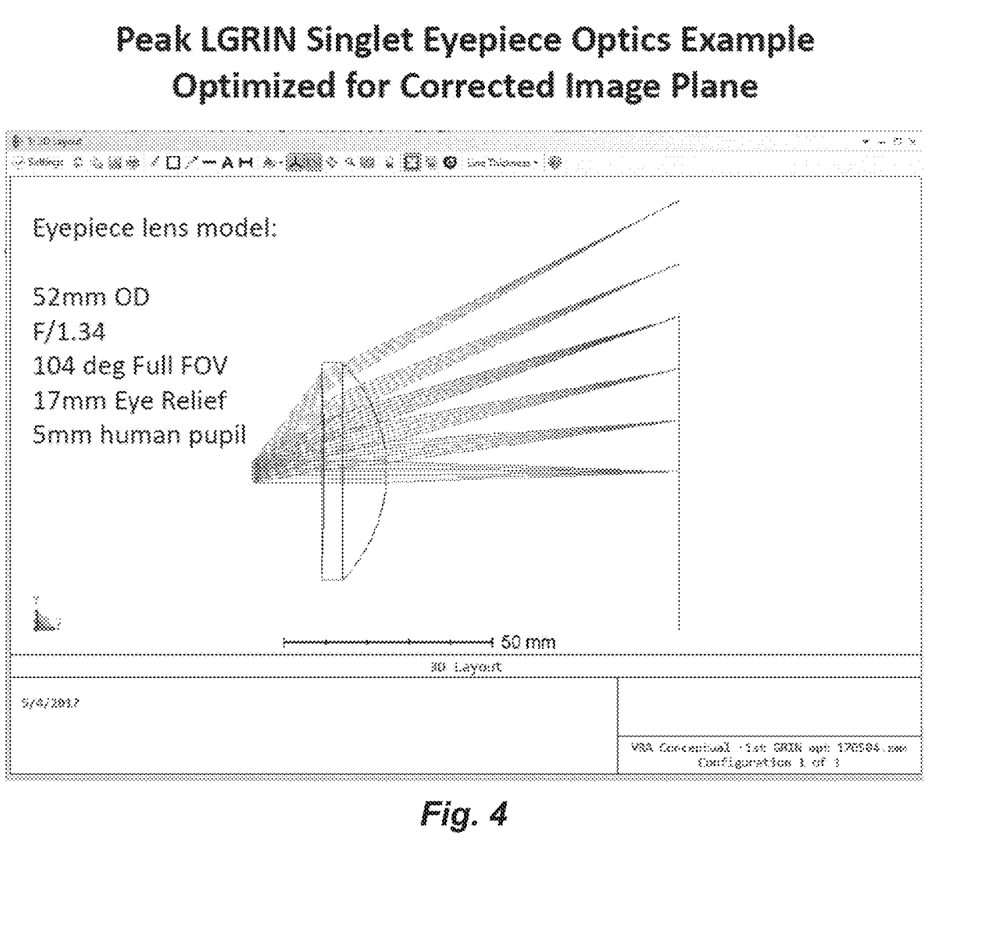
FIG. 4 is a diagram showing optical data for a LGRIN single eyepiece optimized for corrected image plane according to one or more aspects of the present disclosure.
Figure 5A:
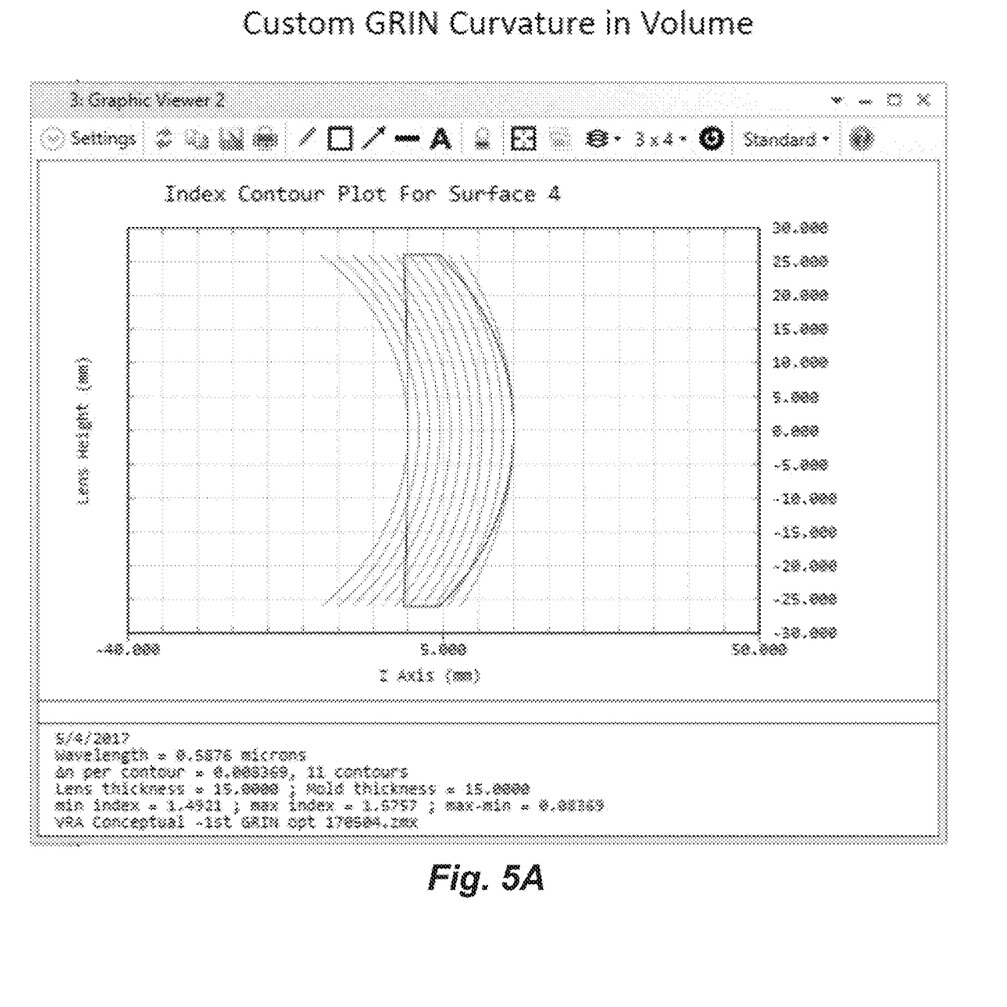
FIG. 5A is a diagram showing GRIN curvature in volume of the LGRIN single eyepiece optimized for corrected image plane of FIG. 4 according to one or more aspects of the present disclosure.
Figure 5B:
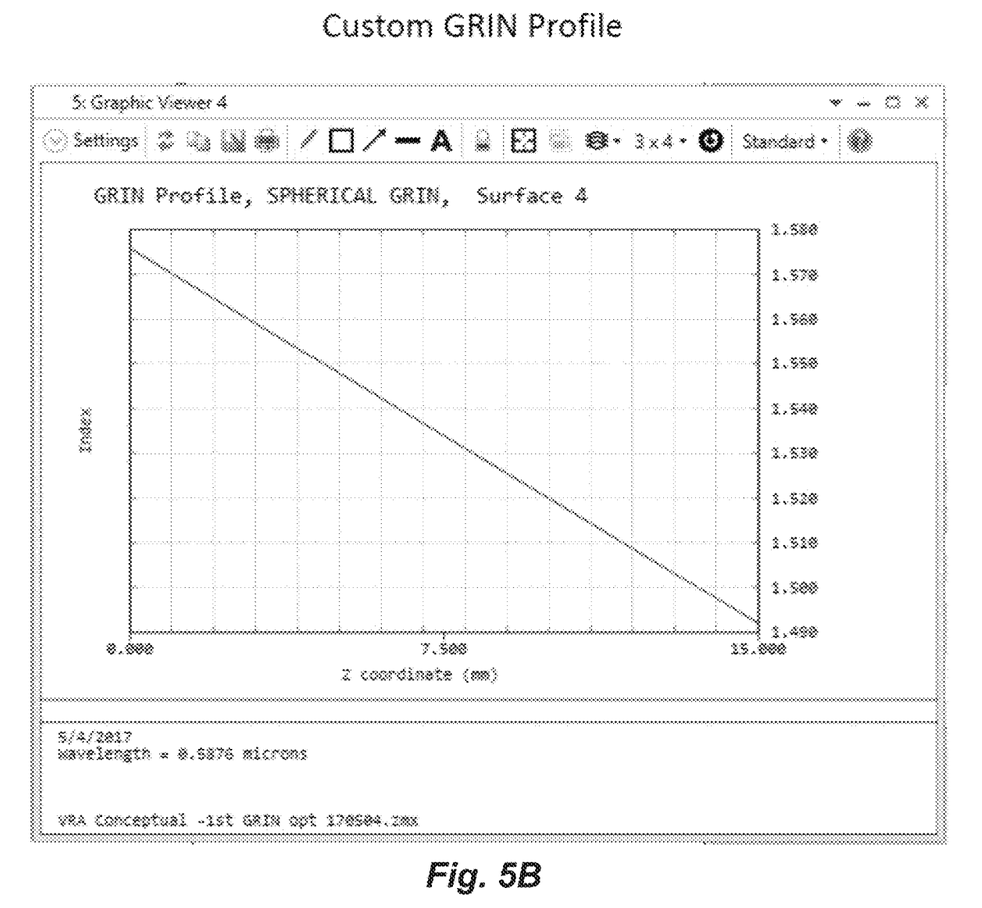
FIG. 5B is a diagram showing the profile of the LGRIN single eyepiece optimized for corrected image plane of FIG. 4 according to one or more aspects of the present disclosure.
Figure 6:
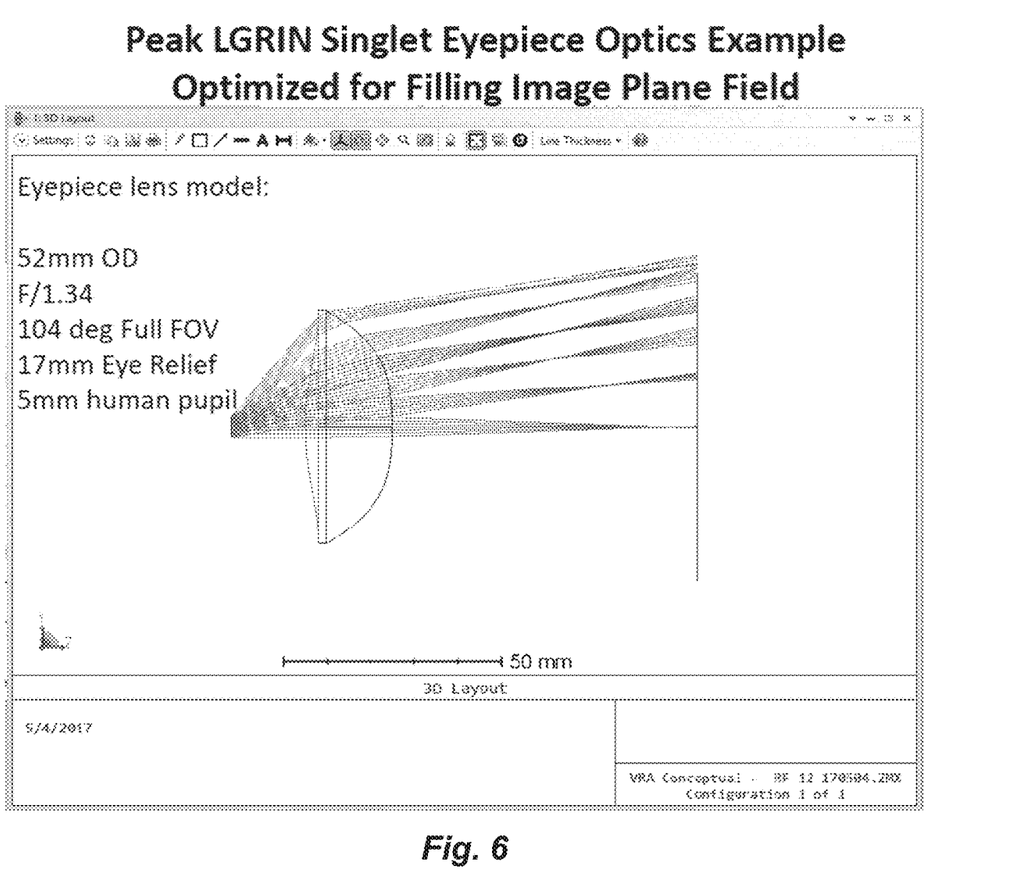
FIG. 6 is a diagram showing optical data for a LGRIN single eyepiece optimized for filling image plane field according to one or more aspects of the present disclosure.
Figure 7A:
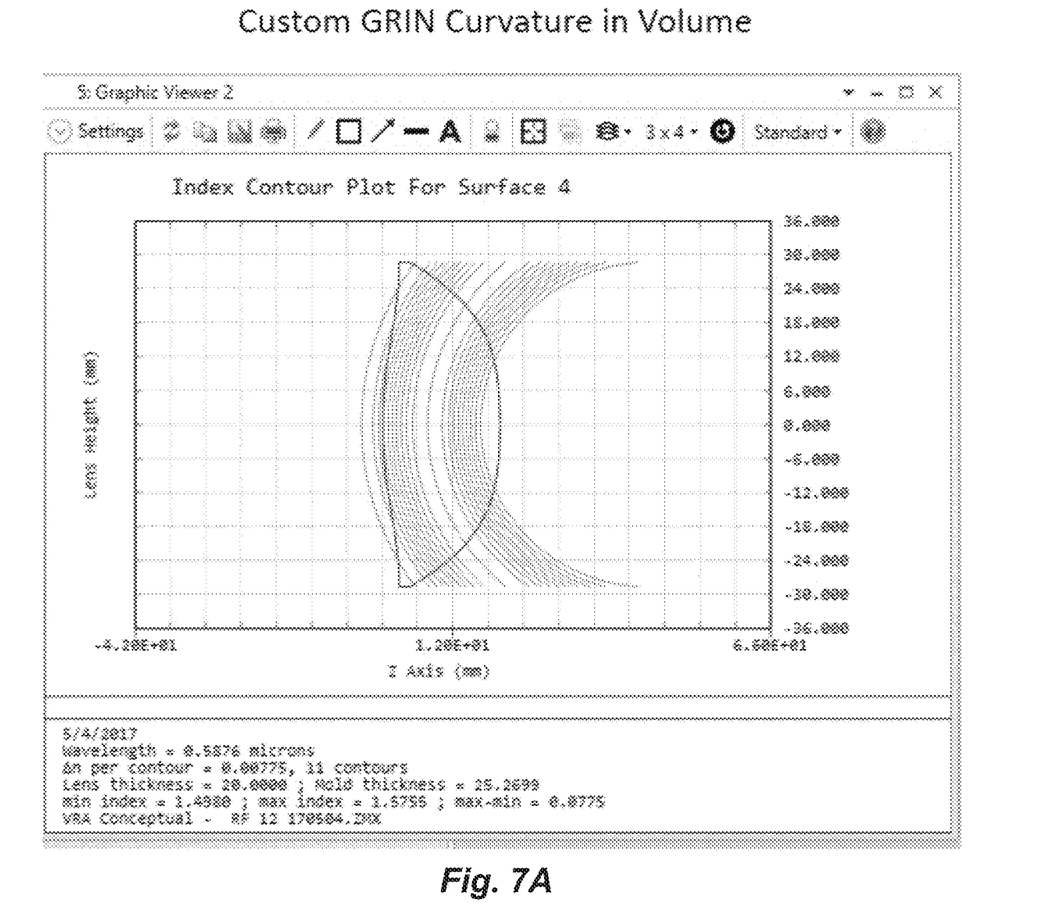
FIG. 7A is a diagram showing GRIN curvature in volume of the LGRIN single eyepiece optimized for filling image plane field of FIG. 6 according to one or more aspects of the present disclosure.
Figure 7B:
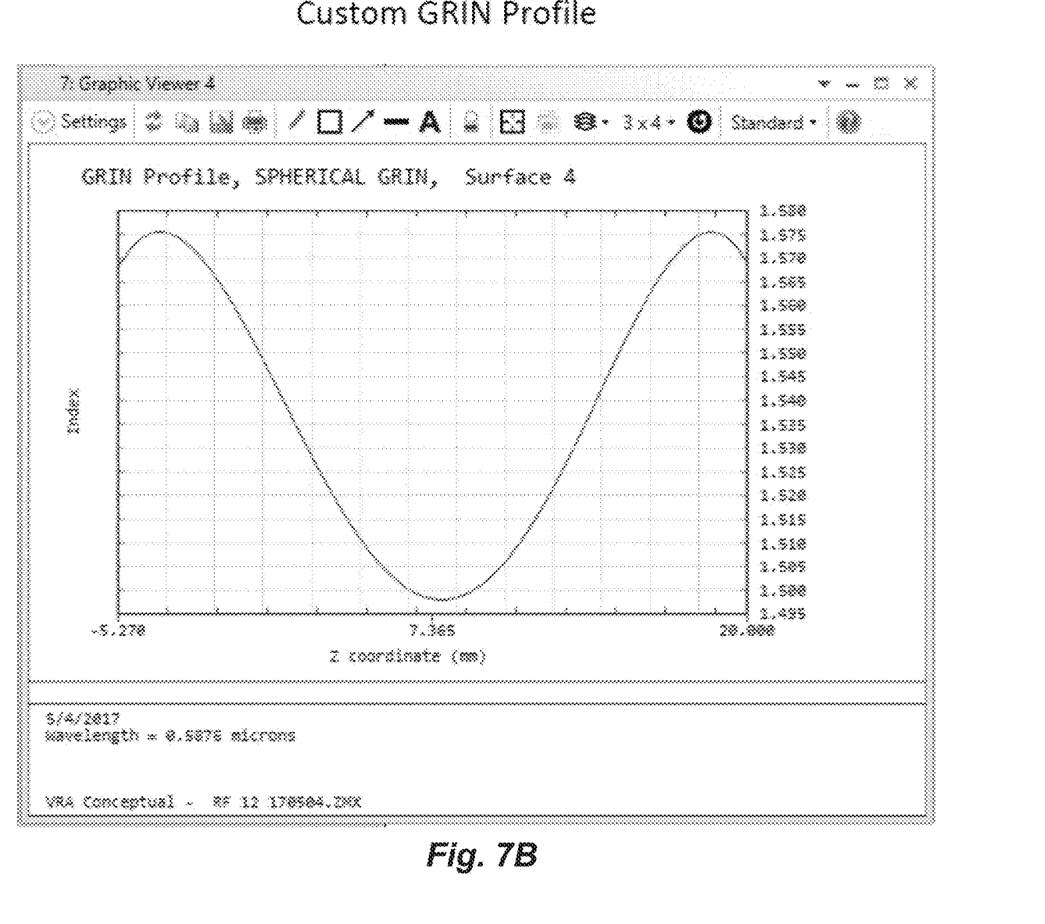
FIG. 7B is a diagram showing the profile of the LGRIN single eyepiece optimized for filling image plane field of FIG. 6 according to one or more aspects of the present disclosure.

FIG. 1B is a cross-section 225 of the front rigid body 205 of the virtual reality headset 200 shown in FIG. 1A according to one or more aspects of the present disclosure, and may include optics block 118, optics block 230, electronic display element 235, diffraction grating 240, and exit pupil 250. The position of an eye 245 of a user is also shown.

In some implementations, the present invention includes a wide field of view (WFOV) fast nanolayered gradient-index (LGRIN) singlet eyepiece study. The goal of this study is to demonstrate feasibility that a design using polymeric nanolayered GRIN optics is capable of controlling the light field to insure full illumination from a large object field into a nominal human pupil-size image field. The eyepiece is designed as typically done in "reverse" using the pupil (5 mm nominal) as the object and the true object field as the "image." This study may include FIGS. 2, 3, 4, 5A, 5B, 6, 7A, and 7B. The success of this study shows that this is a possible application of the LGRIN materials and optical design tools.

The invention claimed is:

1. A virtual reality (VR) headset, comprising: an optics block configured to magnify image light including generated blur spots received from a corrective element, optically correct the magnified image light, and direct the optically corrected magnified image light to an exit pupil of the VR headset corresponding to a location of an eye of a user of the VR headset, wherein the corrective element comprises a gradient refractive index (GRIN) element forming a corrective GRIN element, wherein the corrective GRIN element has one or more diffractive or patterned surfaces for added optical power or color correction.

2. The virtual reality headset of claim 1, wherein the corrective GRIN element is comprised of polymer, inorganic glass, or a composite of polymer and glass materials.

3. The virtual reality headset of claim 2, wherein the corrective GRIN element is constructed from layered films, sheets, or subcomponents of one or more polymer, glass, blend, or composite structure of varying refractive index or varying Abbe numbered materials.

4. The virtual reality headset of claim 3, wherein the corrective GRIN element is a singlet or doublet optical element.

5. The virtual reality headset of claim 4, wherein the corrective GRIN element is a spherical, aspheric, or freeform geometrical refractive or reflective optic.

6. The virtual reality headset of claim 1, wherein the optics block is sized and shaped for securing and stabilizing the corrective GRIN element within a casing in a position and orientation for direction and focus of waves refracted by the corrective GRIN element onto a sensor means.

7. The virtual reality headset of claim 6, wherein the corrective GRIN element is comprised of polymer, inorganic glass, or a composite of polymer and glass materials.

8. The virtual reality headset of claim 7, wherein the corrective GRIN element is constructed from layered films, sheets, or subcomponents of one or more polymer, glass, blend, or composite structure of varying refractive index or varying Abbe numbered materials.

9. The virtual reality headset of claim 8, wherein the corrective GRIN element is a singlet or doublet optical element.

10. The virtual reality headset of claim 9, wherein the corrective GRIN element is a spherical, aspheric, or freeform geometrical refractive or reflective optic.

11. The virtual reality headset of claim 10, wherein the corrective GRIN element has one or more nanolayered films.

* * * * *

UNITED STATES PATENT AND TRADEMARK OFFICE
CERTIFICATE OF CORRECTION

Page 1 of 1

PATENT NO. : 10,768,344 B2
APPLICATION NO. : 15/972796
DATED : September 8, 2020
INVENTOR(S) : Howard Fein et al.

It is certified that error appears in the above-identified patent and that said Letters Patent is hereby corrected as shown below:

On the Title Page

Item (72) Inventors:
Change "Jame C. "Chad" Lewis, Crawford, TX (US)"
To --James C. "Chad" Lewis, Crawford, TX (US)--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*